May 8, 1962   M. GRECO   3,033,263
TIRE VALVE
Filed May 8, 1959
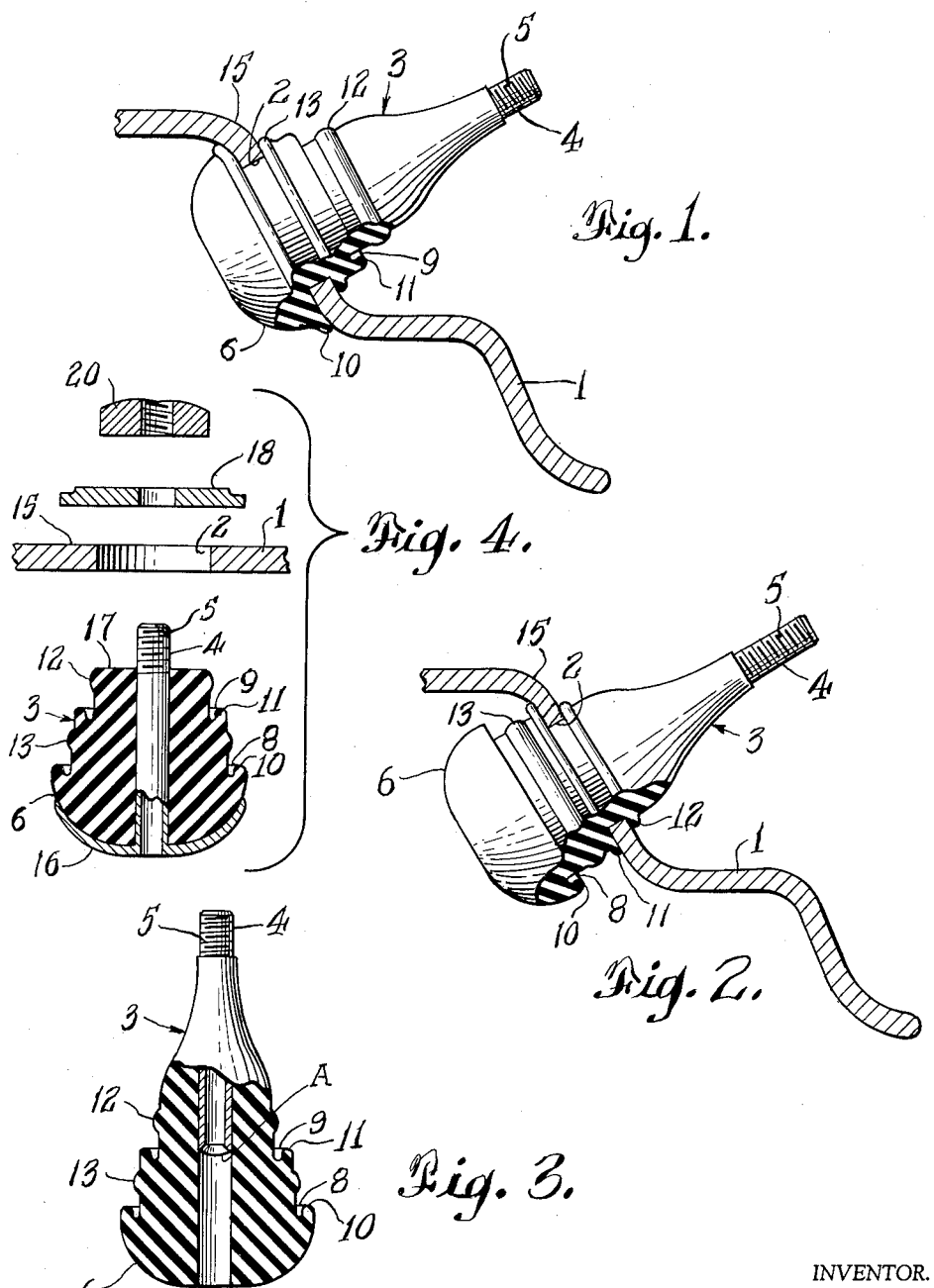
INVENTOR.
MICHAEL GRECO
BY Donal E. McCarthy
ATTORNEY

United States Patent Office 3,033,263
Patented May 8, 1962

3,033,263
TIRE VALVE
Michael Greco, 428 W. Anderson Ave., Hackensack, N.J.
Filed May 8, 1959, Ser. No. 811,828
2 Claims. (Cl. 152—427)

The present invention relates to a valve which is particularly adapted and intended for use in connection with a rim upon which is mounted a tire. More particularly, the present invention is directed to a universal type of tire valve which is suitable for use with rims of wheels of variable diameter, such as, for example, with wheelbarrow through truck type wheels.

A tubeless tire, for example, of the type that requires introduction of inflationary air through the tire rim has heretofore presented the serious problem of providing a fluid-tight seal between the valve stem and the rim. Among the expedients which have heretofore been employed is one in which the valve stem has been permanently attached to the rim as by welding. Another means employed has been the use of a metal valve stem and rim nut for tire inner tubes and provide a rubber washer about the stem between the tire rim and the valve base, said washer being so disposed that when the rim nut is tightened, the washer seals the rim valve hole about the valve stem. Both the aforementioned expedients present serious difficulties since replacement of an injured valve stem, in the case of welded valve stems, is complicated since they are not easily removable and affixed to a tire rim. In the case of rubber washer and nut, the washer itself is subject to deformation under conditions of use which present maintenance of a fluid type seal and constantly require adjustment to maintain a fluid tight seal.

Additionally, tire valves of the type described are not universally adapted for use for more than one type of tire rim.

It is an object of the present invention, therefore, to provide an elastomeric tire valve stem which is easily affixed to and removable from a rim particularly with respect to use with tubeless tires.

Another object of the present invention is to provide a self-sealing and self-retaining elastomeric valve stem particularly adapted for use with a tubeless tire and rim assembly.

A further object of the present invention is the provission of an elastomeric tire valve assembly which is adapted for use with tire rims of variable diameter.

Still another object of the invention is to provide a valve stem having a rigid metallic barrel with elastomeric or rubbery-like material molded about and extending along the axis of said stem which elastomeric material is of such shape that adapts it to be drawn into the valve hole of a tire rim and makes a fluid type seal with the edges of said valve hole as to prevent the disturbance of said seal when the valve stem is subjected to lateral pressure in service which occurs when the stem is struck with stones or having foreign objects pressed against the side of the stem.

A still further object of the present invention is the provision of a valve stem having a rigid metallic barrel with elastomeric or rubbery-like material molded about said stem which material is so molded that the inflationary air of the tire effects a fluid-tight seal between the valve and the side of the rim valve hole.

These and other objects of the invention are attained and will become immediately apparent by the construction and operation thereof as hereinafter more fully described, reference being made to the accompanying drawings forming a part hereof, wherein like numerals refer to like parts throughout and in which:

FIGURE 1 is a partial cross-section of a tire rim with the tire valve occupying one of the positions of final attachment to a rim;

FIGURE 2 is a partial cross-section of a tire rim with the tire valve of the invention occupying another position of final attachment to a rim;

FIGURE 3 is a longitudinal cross-sectional view of an embodiment of the valve stem embodying the present invention;

FIGURE 4 is an exploded view in longitudinal cross-section of another embodiment of the invention.

Referring now specifically to FIGURES 1-3, the numeral 1 indicates a tire rim intended for the mounting of a tubeless tire. This rim is provided with a valve hole as indicated at 2, in FIGURES 1 and 2, intended for the reception of a valve stem. The valve stem of the present invention comprises a body or housing 3, of rubber or equivalent flexible or elastomeric material and having a central passage extending longitudinally therethrough. This housing is adapted to receive a tubular metal insert 4 through said central passage and is adhesively bonded thereto substantially along the entire area of contact, except at its lower end portion as hereinafter more fully explained thereby insuring against the leakage of air between the insert and rubber housing which surrounds it. The tubular insert 4 is threaded on the outer surface thereof at 5 to receive a valve cap as is conventional. The internal area of tubular insert 4 is adapted to accommodate a standard, replaceable valve insides or core (not shown).

The elastomeric housing, externally, is generally tapered and of increasing diameter from the nipple end of the stem to a bulbous or mushroom portion shaped as indicated at 6 at the lower or inner end thereof. A portion of said housing at a point from the nipple end thereof to a point intermediate the full length therof being of a smaller diameter than the valve hole to facilitate introduction thereof into said valve hole. Between the nipple end of the stem and the bulbous portion of the valve are located a plurality of axially extending annular grooves in spaced parallel relationship as indicated at 8 and 9. The lower portion flanges of the grooves are dished out or mushroomed as indicated at 10 and 11 so as to give better gripping properties when the valve is inserted into the opening in the rim.

The external surface of the housing 3 is provided with peripheral beads or shoulders 12 and 13 convex in axial section. The upper peripheral bead of each of said grooves is of less radial dimension than the corresponding lower opposed flange and each bead and its corresponding flange is spaced apart substantially less than the thickness of a rim upon which the valve stem is to be mounted. In operative position the shoulders or beads bear against the outer surface 15 adjacent the valve hole and the flanges 10 or 11 will be drawn up against the face of the rim from the side into which the valve is inserted. Thus, the peripheral beads or shoulders serve as an indication that the valve stem flanges have been pressed home against the inner face of the rim and lock the valve stem onto the rim within and around the valve hole therein to provide a fluid-tight seal therewith.

The assembly shown in FIGURE 4 represents a modification of the present invention in which the valve stem is shown in a form suitable for use in truck tire applications. The valve stem is attached to tire rim 1 at a rim valve hole 2. The valve stem comprises a tubular metal insert 4 externally threaded at one end portion 5 thereof, the opposite end comprising a dished out or mushroom-shaped portion as indicated at 16 and adapted to receive an elastomeric housing generally indicated at 3 and shown in cross section. The external surface of elastomeric housing 3 adjacent the threaded portion 5 of tubular metal insert 4 is flat as indicated at 17 and is generally tapered from said flat portion 17 and of increasing diameter from said portion to a bulbous or mushroom portion 6 and adapted to seat contiguously with the inner face of the portion 16.

Between the flat portion 17 adjacent the nipple end of the stem and the bulbous portion of the elastomeric housing are located on the external surface thereof a plurality of axially extending annular grooves in spaced parallel relationship as indicated at 8 and 9. The lower portion flanges of the grooves are dished out or mushroomed as indicated at 10 and 11.

The external surface of the housing 3 is provided with peripheral beads or shoulders 12 and 13, convex in axial section. The upper peripheral beads of each of said grooves being of less radial dimension than the corresponding lower opposed flange and are spaced apart substantially less than the thickness of a rim upon which the valve stem is to be mounted. In operative position the shoulders or beads bear against the outer surface 15 adjacent the valve hole and the flanges 10 or 11 will be drawn up against the face of the rim from the side into which the valve is inserted.

In operation the tubular metal insert having mounted thereon the elastomeric housing is inserted into the valve hole of a tire rim and extends therethrough and seats in 10 or 11 depending on the size of the tire rim employed. The valve stem extends axially outwardly of the rim valve hole. A metal washer 18 fits around the insert and contacts flat portion 17 and a nut 20 is in threaded relation with portion 5 in contact with washer 18.

Thus, it may be observed that one of the distinct advantages of the invention is that when the tire valve is inserted into a tire rim and seated in one of the positions near the top of the valve an additional safety factor is present which is inherent in the device of the invention, i.e., when the valve is in service and mounted in a rim assembly, road use and attack by the elements tend to corrode and degrade the elastomeric or rubbery housing in which event any tendency of the flanges 10 and 11 to wear and deform could present a serious problem and enhance the danger to the driver of a vehicle. If such a condition exists, the device of the present invention overcomes the same by virtue of its construction since the inflationary air in the tire will force the tire valve to reseat in the next lower position thus alleviating the attendant danger until such time that repairs can be made.

A further advantage of the valve stem resides in the fact that the tubular metal insert 4 of the embodiment illustrated in FIGURES 1–3 extends throughout the body 3 of the valve stem and at its lower portion is free in the sense that it is not adhesively bonded to the body 3. Therefore, if the valve stem be either purposely or accidentally struck by some instrument or object, the stem will be flexible in the region indicated at A since the upper part of the insert is tightly bonded to the body 3. This portion of the valve stem which tends to be flexed is above the portions of the stem which will be in engagement with the periphery and the contiguous parts of the valve hole 2 in tire rim 1.

The foregoing is considered as illustrative of the principles of the invention. Further, since numerous modifications and changes will readily occur to those skilled in the art, it is not desired to limit the invention to the exact construction and operation shown and described and, accordingly, all suitable modifications and equivalents can be resorted to, falling within the scope of the invention as claimed.

What is claimed is:

1. A valve stem adapted to be mounted in the valve opening of a tire rim comprising an elastomeric housing generally tapered and of increasing diameter from the nipple end of said stem to a mushroom-shaped portion with at least a portion of the length of said valve stem of smaller diameter than an opening in a tire rim to facilitate introducing the valve stem through such opening and having a central axial opening therethrough, a tubular metal insert adapted to be inserted and extend through said centrally located axial opening, one end thereof having a mushroom-shaped configuration adapted to seat contiguously with said mushroom-shaped portion of said elastomeric housing, the opposite end of said tubular metal insert being externally threaded and extending through said housing and adapted to receive a valve insides and exteriorly receive a washer and a nut in threaded relation so as to maintain said elastomeric housing in operative engagement with said hollow cylindrical insert, said elastomeric body being provided at points above said mushroom-shaped portion and on the outer surface thereof with a plurality of circumferentially extending parallel annular grooves each having an upper peripheral bead and a lower opposed flange and being spaced apart at a distance substantially less than the thickness of a rim upon which the valve stem is mounted, the structure being such that when the valve stem above the mushroom-shaped portion is forced through an opening in a tire rim a peripheral bead will engage the face of the rim opposite to that into which the valve stem is inserted whereupon the walls of the groove will engage the inner surface of the valve rim opening and the lower flange of said groove will be drawn up against the face of the rim from the side into which the valve is inserted to securely hold the same onto the rim and prevent the passage of air thereby when a tire mounted on said tire rim is caused to be inflated through said valve insides.

2. A valve stem adapted to be mounted in the valve opening of a tire rim, said valve stem comprising an elastomeric housing generally tapered and of increasing diameter from the nipple end of said stem to a mushroom-shaped portion with at least a portion of the length of said valve stem of smaller diameter than an opening in a tire rim to facilitate introducing the valve stem through such opening and having a central axial opening therethrough, a hollow cylindrical insert extending through said opening and having a mushroom-shaped configuration at one end thereof adapted to seat contiguously with said mushroom-shaped portion of the elastomeric housing, said valve stem being adapted to interiorly mount a valve therein and exteriorly receive a washer and a nut in threaded relation so as to maintain said elastomeric housing in operative engagement with said hollow cylindrical insert, said elastomeric body being provided at points above said mushroom-shaped portion and on the outer surface thereof with at least one circumferentially extending annular groove having an upper peripheral bead and a lower opposed flange and being spaced apart at a distance substantially less than the thickness of a rim upon which the valve stem is mounted, the structure being such that when the valve stem above the mushroom-shaped portion is forced through an opening in a tire rim the peripheral bead will engage the face of the rim opposite to that into which the valve stem is inserted whereupon the walls of the groove will engage the inner surface of the valve rim opening and the lower flange of said groove will be drawn up against the face of the rim from the side into which the valve is inserted to securely hold the same onto the rim and prevent the passage of air thereby when a tire mounted on said tire rim is caused to be inflated through said valve insides.

References Cited in the file of this patent

UNITED STATES PATENTS

| 2,862,539 | Williams | Dec. 2, 1958 |
| 2,966,191 | Williams | Dec. 27, 1960 |
| 2,968,333 | Ayres | Jan. 17, 1961 |

FOREIGN PATENTS

| 519,851 | Italy | Mar. 16, 1955 |
| 1,117,950 | France | Mar. 5, 1956 |